Nov. 28, 1961 E. S. McVEY 3,011,068

SEMICONDUCTOR RAMP FUNCTION GENERATOR

Filed July 29, 1957

INVENTOR.
EUGENE S. McVEY

BY J. J. Schmitt
H. H. Losche
ATTORNEYS

United States Patent Office 3,011,068
Patented Nov. 28, 1961

3,011,068
SEMICONDUCTOR RAMP FUNCTION GENERATOR

Eugene S. McVey, Lafayette, Ind.
(2702 Eton Road, Charlottesville, Va.)

Filed July 29, 1957, Ser. No. 674,983
3 Claims. (Cl. 307—88.5)
(Granted under Title 35, U.S. Code (1952), sec. 266)

The invention described herein may be manufactured and used by or for the Government of the United States of America for governmental purposes without the payment of any royalties thereon or therefor.

This invention pertains to ramp function generators wherein semiconductors are utilized effectively. In accordance with this invention a ramp function generator may comprise means including a transistor for providing a source of constant current, means for storing an electrical charge coupled between the constant current source and a ground source of constant reference potential; and means including a semi-conductor switch coupled in parallel with the said charge storage means. The semiconductor switch may be operated periodically by a switching voltage, thereby establishing repetitive charge-discharge cycles of the charge storage means.

Thus, a ramp function generator in accordance with this invention provides a simple, rugged, reliable, compact, light weight, and economical source of linearly-increasing unidirectional potentials of the kind which may be utilized to advantage in radar systems. A ramp function generator in accordance with this invention is especially useful in airborne equipment where its light weight, compactness, and ruggedness are particularly important.

Heretofore, ramp function generators have utilized ordinary vacuum and gas-filled tubes. As a result, such generators have been subject to the usual disadvantages of circuitry containing such components. For example, the use of vacuum and gas-filled tubes diminishes reliability and increases size, weight, and power requirements.

It is a principal object of this invention to provide a ramp function generator in which disadvantages such as those set forth above are obviated through the use of semiconductor elements in lieu of tubes.

An exemplary embodiment of the invention may comprise a first transistor biased to provide a source of constant current, means for accumulating an electrical charge such as a capacitor coupled between the constant current source and a ground source of constant reference potential, a second transistor coupled across the accumulating means, and a source of fluctuating bias potential for causing the second transistor to operate as a switch, thereby establishing periodic charge-discharge cycles of the accumulating means. A ramp voltage output signal may be derived from an output terminal coupled to the accumulating means.

In accordance with a modification of the preferred embodiment a semiconductor diode may be used in lieu of the second transistor in order to fulfill the switching function thereof.

The foregoing summary of the invention, discussion of the problems which it resolves, and statement of its object are intended merely to facilitate the development of an understanding and appreciation of its principal features, not to restrict its scope. It is probable that additional objects and features of the invention will become apparent after reference to the following detailed description and accompanying drawings wherein.

Figure 1:
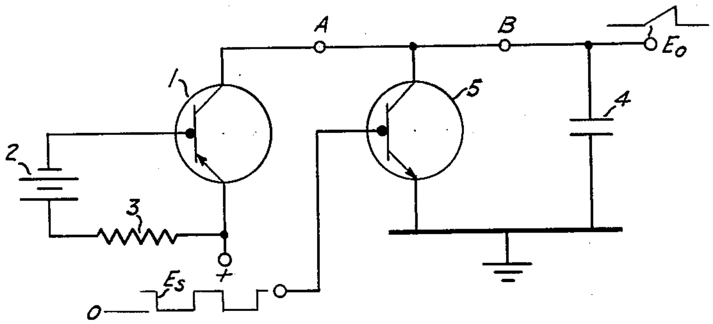
FIG. 1 represents a preferred embodiment of the invention.

The embodiment of the invention represented in FIG. 1 comprises a transistor 1 of the P-N-P type having its emitter coupled to a source of positive potential, its base coupled via series-connected battery 2 and resistor 3 to a source of positive potential, and its collector coupled to a ground source of constant potential via the parallel combination of a charging capacitor 4 and a transistor switch 5 of the N-P-N type. The collector and emitter of transistor switch 5 are coupled, respectively, to the upper plate of charging capacitor 4 and the ground source of constant reference potential. Fluctuating bias potential $E_s$ having periodic square wave excursions from a normally positive level of constant magnitude is coupled to the base of the transistor switch 5.

In the operation of the embodiment of FIG. 1, the transistor 1 provides a source of constant current. Inasmuch as the collector electrode of transistor 1 is less positive than the emitter electrode, and the base electrode receives a negative bias from battery 2, electron current flows from collector to emitter. The resistor 3 establishes a potential reference level for battery 2, such that the tendencies of the bias potentials on the emitter and base electrodes to vary with changes in the collector current are reduced substantially.

Figure 2:
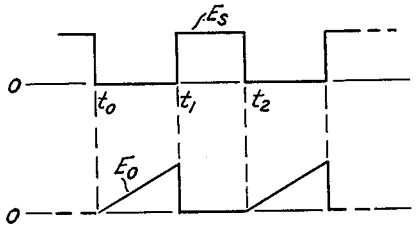
FIG. 2 represents the shape and time interrelationship between the ramp function output signal and the transistor switch control signal of FIG. 1.

Assume that a cycle of operation begins at time $t_0$. As shown in FIG. 2, the fluctuating bias potential $E_s$ applied to the base electrode of transistor switch 5 has dropped abruptly from its maximum positive value to zero, thereby preventing the conduction of electron current therethrough. As a result, the constant electron current flowing from the collector to the emitter electrode of transistor 1 begins to develop a steadily rising constant positive potential on the upper plate of charging capacitor 4. The positive potential on the charging capacitor 4 continues to rise linearly during the time interval $t_0$ to $t_1$ that transtistor switch 5 is cut off, thereby producing the ramp function waveform of output signal $E_0$.

At time $t_1$, fluctuating bias potential $E_s$ on the base electrode of transistor switch 5 abruptly changes to its constant positive value, causing transistor switch 5 to close and provide a path for the flow of electron current from its emitter to collector. The flow of electron current abruptly discharges the accumulated positive potential on the upper plate of charging capacitor 4 and provides a low-impedance path for drawing the electron current required by transistor 1 from the ground source of constant reference potential.

During the time interval $t_1$ to $t_2$ the base electrode of transistor switch 5 is held positive by a fluctuating bias potential $E_s$ and, as a result, no charge accumulates in charging capacitor 4. At time $t_2$, however, the fluctuating bias potential $E_s$ once more drops abruptly to zero, interrupting the flow of electron current in transistor switch 5 and initiating a new charging cycle which proceeds in the same manner as the one described above.

Figure 3:
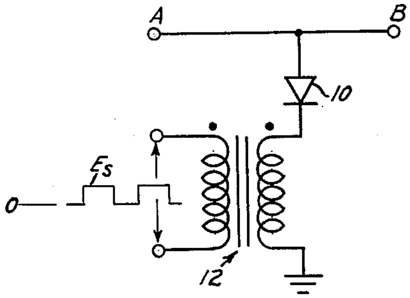
FIG. 3 represents a semiconductor diode switch which may be utilized in lieu of the transistor switch of FIG. 1.

In lieu of transistor switch 5 the semiconductor diode switch represented in FIG. 3 may be coupled to terminals A and B in the embodiment of FIG. 1. This switch may comprise semiconductor diode 10 normally biased for the flow of electron current in the forward direction. When the fluctuating bias potential $E_s$ is applied to the terminals of transformer 12, however, the square wave excursions in the positive direction result in the application of a positive potential to the plate element of semiconductor 10, thereby biasing it inversely, cutting off the flow of electron current therethrough and permitting charging capacitor 4 to begin rising linearly in the positive direction, as represented by the waveform $E_0$ of FIG. 2.

It should be understood, of course, that P-N-P and N-P-N transistors may be interchanged with transistors 1 and 5 provided that proper biasing potentials are applied thereto. A change in transistor type, however, may result in a reversal of polarity of the resulting ramp function output signal. For example, the substitution of an N-P-N transistor in lieu of transistor 1 would cause electron current normally to flow from emitter to collector. Accordingly, during intervals when transistor switch 5 is open a negative charge would be accumulated on the upper plate of charging capacitor 4 and the resulting ramp function output signal $E_0$ will have a negative slope.

The details illustrated in the accompanying drawings and set forth in the foregoing description are intended merely to facilitate the practice of the invention by persons skilled in the art. The scope of the invention is represented in the following claims.

What is claimed is:

1. A ramp function generator comprising: a first transistor having constant current characteristics and having a base zone of one conductivity interposed between emitter and collector zones of opposite conductivity; a charging capacitor coupled between said first transistor and a ground source of constant reference potential, means coupling the emitter-collector path of the first transistor in series between a source of constant positive potential and said ground source of constant reference potential; means including a battery and a resistor coupled in series between the emitter and base zones of the first transistor to form a self-compensating source of base-biasing potential; a second transistor having a base zone of one conductivity interposed between emitter and collector zones of opposite conductivity; means coupling the emitter-collector path of the second transistor in parallel relation with the said charging capacitor; a source of square waves of positive polarity coupled to the base zone of the second transistor; and an output terminal coupled to the said charging capacitor.

2. A ramp function generator comprising: a transistor having constant current characteristics and having a base zone of one conductivity interposed between emitter and collector zones of opposite conductivity; a charging capacitor coupled between said transistor and a ground source of constant reference potential; means coupling the emitter-collector path of said transistor in series between a source of constant positive potential and said ground source of constant reference potential; means including a battery and a resistor coupled in series between the emitter and base zones of said transistor to form a self-compensating source of base-biasing potential; a semiconductor diode and an input transformer serially coupled in parallel with said charging capacitor and adapted to establish repetitive charge-discharge cycles in said charging capacitor; a source of rectangular waves coupled to said input transformer; and an output terminal coupled to the said charging capacitor.

3. A ramp function generator comprising: a transistor having constant current characteristics and having a base zone of one conductivity interposed between emitter and collector zones of opposite conductivity; a charging capacitor coupled between said transistor and a ground source of constant reference potential; means coupling the emitter-collector path of said transistor in series between a source of constant potential and said ground source of constant reference potential; means including a battery and a resistor coupled in series between the emitter and base zones of said transistor to form a self-compensating source of base-biasing potential; a semiconductor means coupled in parallel with said charging capacitor, said semiconductor parellel coupling having an input means to receive square wave control signals for establishing repetitive charge-discharge cycles of said charging capacitor; and an output terminal coupled to the plate of said charging capacitor remote from said ground source whereby ramp function voltages are developed on said output.

References Cited in the file of this patent

UNITED STATES PATENTS

| | | |
|---|---|---|
| 2,489,312 | Pacini | Nov. 29, 1949 |
| 2,728,857 | Sziklai | Dec. 27, 1955 |
| 2,735,011 | Dickinson | Feb. 14, 1956 |
| 2,859,360 | Suran | Nov. 4, 1958 |
| 2,891,173 | Helbig | June 16, 1959 |
| 2,925,585 | Bruce | Feb. 16, 1960 |

OTHER REFERENCES

"Radar Electronic Fundamentals," NAVSHIPS, 900,-016, June 1944, page 261.